Dec. 18, 1956 W. N. POUNDSTONE 2,774,462
SPOOLED RIBBON SUPPORTED EXTENSIBLE BELT CONVEYOR
Filed Sept. 1, 1955 3 Sheets-Sheet 1
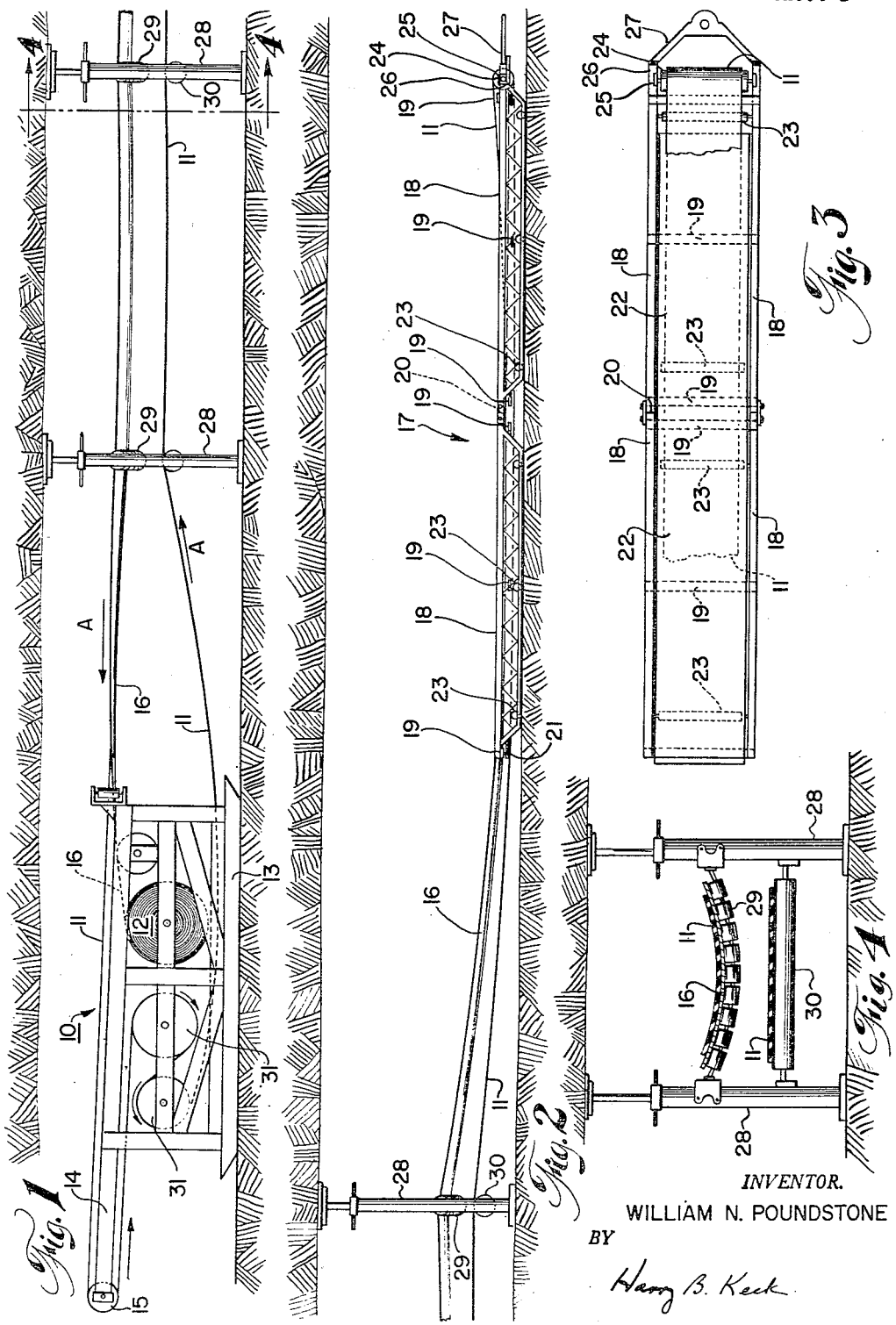
INVENTOR.
WILLIAM N. POUNDSTONE
BY
Harry B. Keck Dec. 18, 1956 W. N. POUNDSTONE 2,774,462
SPOOLED RIBBON SUPPORTED EXTENSIBLE BELT CONVEYOR
Filed Sept. 1, 1955 3 Sheets-Sheet 2
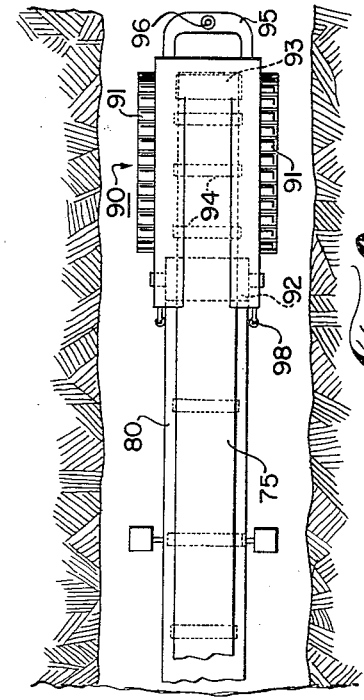
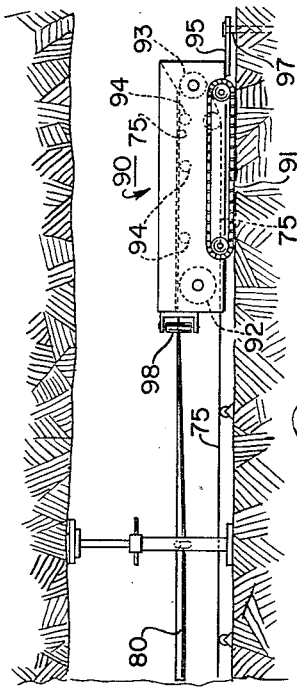
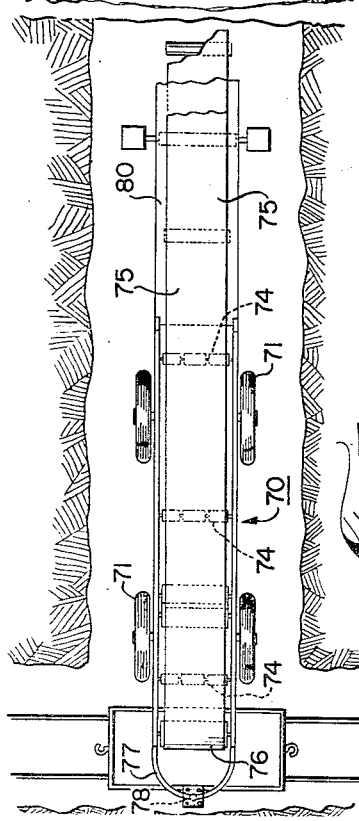
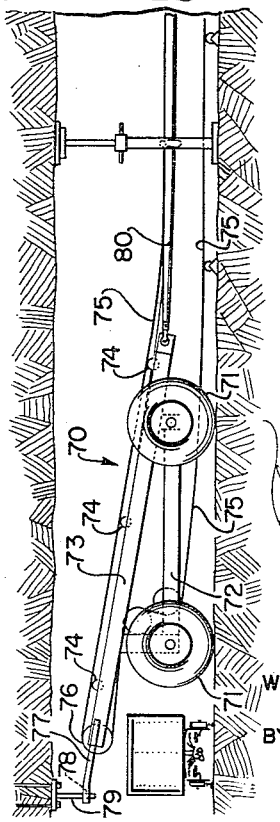
INVENTOR.
WILLIAM N. POUNDSTONE
BY
Harry B. Keck Dec. 18, 1956 W. N. POUNDSTONE 2,774,462
SPOOLED RIBBON SUPPORTED EXTENSIBLE BELT CONVEYOR
Filed Sept. 1, 1955 3 Sheets-Sheet 3
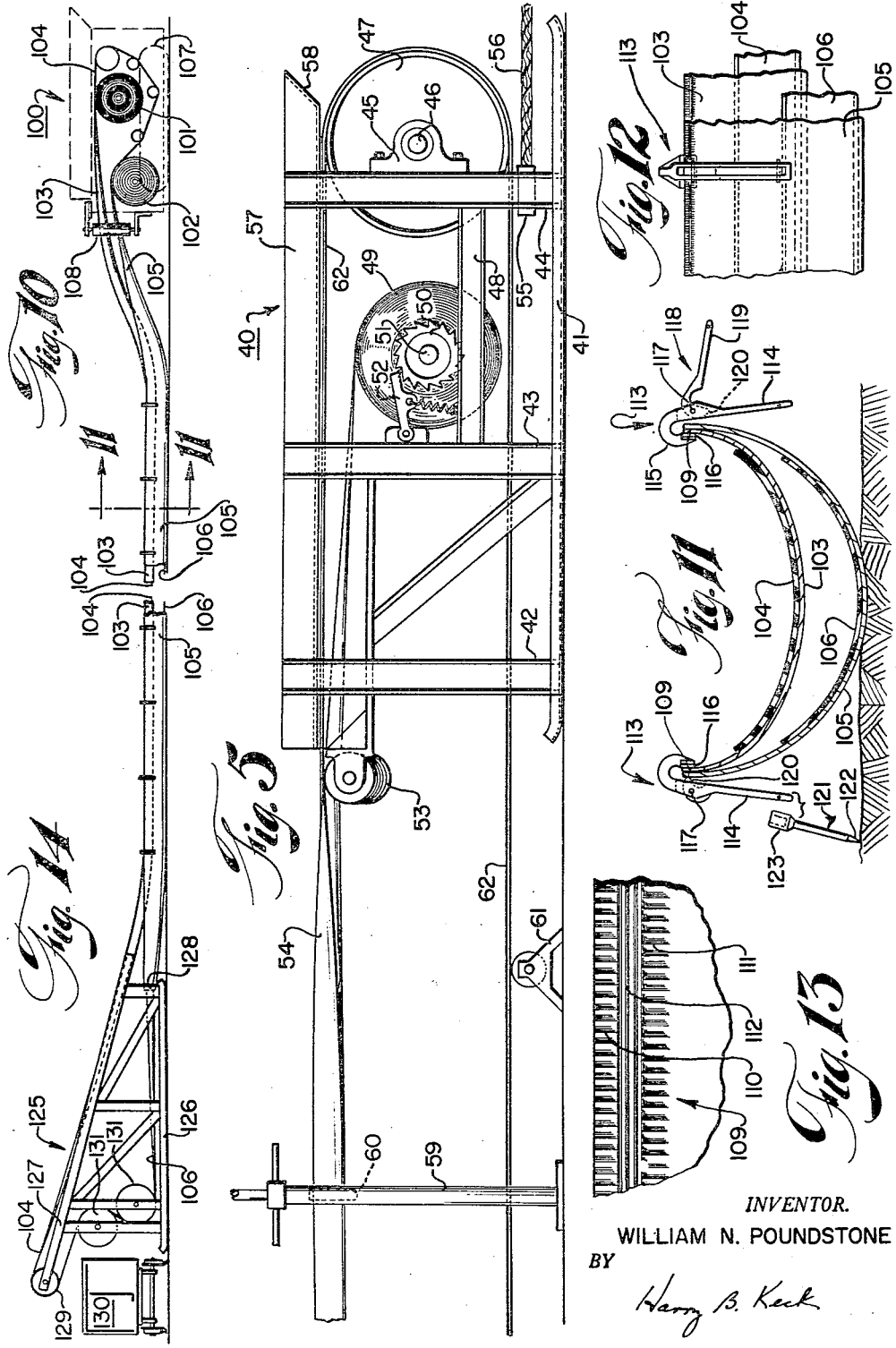
INVENTOR.
WILLIAM N. POUNDSTONE
BY
Harry B. Keck

United States Patent Office

2,774,462
Patented Dec. 18, 1956

2,774,462

SPOOLED RIBBON SUPPORTED EXTENSIBLE BELT CONVEYOR

William N. Poundstone, Morgantown, W. Va., assignor to Pittsburgh Consolidation Coal Company, Pittsburgh, Pa., a corporation of Pennsylvania Application September 1, 1955, Serial No. 531,941

12 Claims. (Cl. 198—139)

The present invention relates to the art of belt conveyers and more particularly, to extensible straight line belt conveyers for use in underground mining operations.

Recent technological advances in the mining industry have resulted in increased productivity at the mining face and have created a problem in conveying the increased mineral production out from the mine. There is a definite need for a conveyer system which can handle the increased mineral production tonnages by permitting rapid installation, extension, retraction and removal. The amount of labor and lost mining production time required to install, extend and remove conventional belt conveyers is excessive. Most of the non-productive labor is required for installing and extending conventional belt conveyers. The remaining non-productive labor is required to align the components of coventional belt conveyers.

In my present invention I have provided a new belt conveyer which can be installed, extended, retracted and removed with a minimum of labor and lost production time. Moreover my new belt conveyer system is self-aligning. My new conveyer does not require bulky sections which are normally used in belt conveyer systems. For movement through a mine to an operating site, my new conveyer is virtually self-contained.

The support for my new conveyer is a long ribbon of stainless steel, aluminum or other suitable high tensile strength, smooth sheet material which can be unwound from a spool to any desired length and can be maintained in tension to provide automatically straight line alignment of the support. The ribbon of stainless steel, for example, also provides a low friction sliding surface for belt movement.

My conveyer comprises a belt driving means at the discharge terminus of the conveying system which can be similar in construction to existing drive units; a tailpiece at the belt loading terminus of the conveying system for receiving the material to be conveyed by the belt; a ribbon, preferably of stainless steel, stretched between the discharge terminus and the tailpiece to provide a sliding surface for flexible conveyer belting; and a single band of flexible conveyer belting laced through the drive unit and the tailpiece and having its loaded portion movable in slidable contact over the stainless steel ribbon. The stainless steel ribbon, wound about a spool from which it can be unwound or rewound to any desired length, may be provided at either end of my conveyer system.

The stainless steel ribbon preferably is pre-troughed so that in a free position its edges tend to fold upwardly to provide a troughed shape, much in the manner of the familiar coiled metal measuring tape. In the simplest embodiment of my invention, troughed roller supports for the ribbon are placed along its length at selected intervals to prevent its flattening or sagging. Preferably these supports are combined with return idler rollers to support the return run of the conveyer belting beneath the stainless steel ribbon.

As an alternate embodiment of my invention, both the loaded run and the return run of conveyer belting in my conveyer belt system can be entirely supported on ribbon by the provision of two rolls of stainless steel ribbon. Each ribbon may be independently supported between the termini of my conveyer belt system. However I prefer to provide the ribbon for the return run in a wider strip than that for the loaded run to permit independent self-support of the ribbons. The two stainless steel ribbons are joined at their edges (when unwound) to provide a space between them for the return belt run. In this embodiment the wide stainless steel ribbon rests on the floor of the mine and supports the narrow stainless steel ribbon above the mine floor.

I have found that the horsepower requirement for sliding conveyer belting over stainless steel does not vary considerably from that required for sliding belts over conventional idler rollers. This is particularly true in the coal mining industry where the dusty atmosphere of the mine causes solid particles to accumulate between the idler rollers to increase their friction resistance. Moreover the dusty atmosphere of coal mines operates to advantage in my new conveyer system since accumulation of dust particles between the sliding conveyer belting and the stainless steel ribbon serves to lubricate the contact surface and reduce sliding friction. If desired, additional lubrication can be provided by injecting powdered graphite, for example, between the belt and the ribbon at the loading end of the conveyer and collecting the powdered lubricant for re-use at the belting discharge terminal. For my belting material I prefer to use a canvas-backed rubber conveyer belting which permits sliding between the canvas surface and the stainless steel surface with a minimum of friction.

It is possible also to use conveyer belting of plastic material other than rubber and to use an oil lubricant between said belting and the stainless steel support. The oil would agglomerate coal dust particles which would serve to reduce the friction between moving belting and the support.

For a clear understanding of the present invention, its objects and advantages, reference should be had to the following description and accompanying drawings in which:

Figure 1 is a side elevation view of the discharge terminus of a single ribbon conveyer system having a spool of stainless steel ribbon associated therewith;

Figure 2 is a side elevation view of the loading terminus and tailpiece of the single ribbon conveyer system shown in Figure 1;

Figure 3 is a plan view of the tailpiece shown in Figure 2;

Figure 4 is a cross section view of the conveyer system shown in Figure 1 taken along the line 4—4;

Figure 5 is a side elevation view of a tailpiece having a spool of stainless steel ribbon for use at the loading terminus of another embodiment of my conveyer system;

Figure 6 is a side elevation view of a discharge terminus of another embodiment of my single ribbon conveyer system;

Figure 7 is a plan view of the embodiment illustrated in Figure 6;

Figure 8 is a side elevation view of a loading terminus of the embodiment of my single ribbon conveyer system illustrated in part in Figure 6;

Figure 9 is a plan view of the embodiment illustrated in Figure 8;

Figure 10 is a side elveation view of a loading terminal of a further embodiment of my conveyer system employing a double ribbon conveyer;

Figure 11 is a cross section view of the embodiment shown in Figure 10 taken along the line 11—11 showing the relationship of the double ribbon;

Figure 12 is a fragmentary view of the embodiment of a double ribbon conveyor system illustrated in Figure 10 showing one means for fastening double ribbons along their edges;

Figure 13 is a fragmentary view of one edge of a ribbon in corrugated form for use in the double ribbon conveyor system of Figure 10; and Figure 14 is a side elevation view of the discharge terminus of the embodiment of a double ribbon conveyer system illustrated in part in Figure 10.

My new conveyer system may be illustrated in one embodiment by reference to Figures 1 and 2 which present a side elevation view of a single ribbon conveyer at the discharge terminus (Figure 1) and the loading terminal (Figure 2). A belt drive unit 10 of any convenient design is provided for driving a moving belt 11 and for containing a spool 12 of stainless steel ribbon. The drive unit 10, shown in Figure 1, is mounted on horizontal skids 13 and, with suitable structural support, is provided with a discharge boom 14 extending forwardly for discharging the contents of the loaded conveyer belt over a belt turnaround pulley 15, rotatably mounted at the forward end of the boom 14. Stainless steel ribbon 16 is unwound from the spool 12 and drawn along a mine passageway to a tailpiece 17 (Figure 2) located at the desired loading point. The tailpiece 17 is constructed of parallel expanded structural beams 18, clamped together as shown in Figure 3 with transverse structural elements 19. The beams 18 serve as lateral members of a generally rectangular frame, and also as skids which permit sliding movement of the tailpiece 17 along the floor of a mine. Two pairs of structural beams 18 are joined in series through a joint 20.

The unreeled end of the stainless steel ribbon 16 is clamped to the tailpiece 17 at its discharge end by a suitable clamping means which is preferably mounted on the tailpiece 17 through a pivot 21 to permit alignment of the ribbon 16 through a mine passageway without regard to the alignment of the tailpiece 17. The upper surface of the tailpiece 17 may be provided with conventional troughed idler rollers or, as shown, may be equipped with a troughed metal sheet 22 to provide a sliding surface for conveyer belting. Horizontal idler rollers 23 are rotatably mounted on the frame of the tailpiece 17 perpendicularly to the direction of belt movement to support the return conveyer belting run above the floor of the mine. A turnaround belt roller 24 is mounted for free rotation in journals 25 which are supported by a bracket 26 extending from the tailpiece 17. A draw bar 27 extends forwardly from the bracket 26 for towing the tailpiece 17. If desired the tailpiece 17 may be anchored in position by any suitable means (not shown) to prevent movement.

A series of roof jacks 28 is provided at suitable intervals along the extension of the stainless steel ribbon 16 for its support. These jacks 28 are provided in pairs as shown in Figure 4 which is a cross section taken along the line 4—4 of Figure 1. A troughed supporting idler 29 is provided between each pair of jacks 28 to prevent sagging of the stainless steel belt and to maintain its troughed shape and avoid flattening. The idler roller 29 may be of the limber type or conventional troughed idler rollers may be employed. A horizontal return belt idler roller 30 may be provided between each pair of jacks 28 beneath the troughed idler roller 29 to support the return run of conveyer belting 11.

When my new conveyer is assembled for operation, the stainless steel ribbon 16 is maintained in tension between the discharge terminus 10 and the tailpiece 17. A continuous strand of conveyer belting 11 passes from the tailpiece 17 along the upper surface of the troughed stainless steel ribbon 16 to the drive unit 10. The belting is turned over the belt turnaround pulley 15 on the loading boom 14 of the drive unit 10 for discharging the contents from the loaded portion of the belt 11. The return belting is laced through one or more drive pulleys 31 which are securely mounted on the drive unit 10 and powered by any suitable means (not shown). The belting passes from the drive unit 10 along the mine passageway beneath the stainless steel ribbon 16 and over the horizontal return belt idler rollers 30 to the tailpiece 17. Return belting passes through the tailpiece 17 over the horizontal return belt idler rollers 23 to the belt turnaround roller 24.

Installation of my new conveyer belt is effected with a minimum of labor and lost production time. The discharge terminus 10, having a spool 12 of stainless steel ribbon 16 fully wound, is positioned in a mine at a desired discharge point. The free end of the stainless steel ribbon 16 is clamped to a tailpiece 17 at its discharge end. The tailpiece 17 is towed through a straight mine passageway unwinding stainless steel ribbon 16 from the spool 12 as it progresses. The towing is effected by means of an available source of tractive power, such as a loading machine, a shuttle car, or any similar available mining machine having self-contained tractive power. Alternatively the tailpiece may be advanced if desired by a winch and cable positioned forwardly of the desired loading point. When the tailpiece 17 has been advanced to a desired loading point, roof jacks 28 are installed on each side of the stainless steel ribbon 16 at selected intervals and the stainless steel ribbon 16 is elevated and supported on a troughed idler roller 29 mounted between each pair of roof supporting jacks 28. A suitable length of conveyer belting 11 is laced into the conveyer system as described and fastened by suitable splicing means. Horizontal return idler rollers 30 are installed preferably between each pair of roof jacks 28 to support the return conveyer belt run and thereupon the tailpiece 17 is advanced slightly to provide the necessary belt tension and the desired tension in the stainless steel ribbon 16. If desired, the tailpiece 17 may be anchored in position by any suitable means (not shown) to prevent movement. Loading operations commence with movement of the belt in the direction indicated by the arrow A.

To advance or retract the belt conveyer system shown in Figures 1 and 2, the tailpiece 17 first is retracted slightly to reduce the tension in the belt 11 and stainless steel ribbon 16. Thereupon the belt 11 is broken at an existing splice and the tailpiece 17 is advanced or retracted to the desired new loading point. Roof supporting jacks 28 are added or removed as required. Conveyer belting is added or removed as required and the desired belting length is spliced together. Thereupon the tailpiece 17 is advanced slightly once more to provide the necessary tension in the conveyer belt 11 and the stainless steel ribbon 16.

The stainless steel ribbon employed to support the conveyer belt in my present invention should have a width exceeding that of the moving belt. In thicknesses of 0.03 to 0.04 inch, the stainless steel ribbon has sufficient strength for use in my new conveyer and adequate length of ribbon can be provided on a spool of relatively small diameter. Ribbon lengths of up to 1,000 feet or more can be readily handled in spool form. Such ribbon is readily available commercially in widths of 30 to 42 inches, for example, which is suitable for use in the present invention.

In the embodiment of this invention shown in Figures 1 and 2, the spool of stainless steel ribbon is contained at the discharge terminus of the conveyer system. However I prefer to provide the spool of stainless steel belting in the tailpiece unit at the loading terminus of the system. This preferred embodiment is illustrated in Figure 5 which is a side elevation view of the loading terminus of my new conveyer system having a spool of stainless steel ribbon contained within a mobile tailpiece. When the stainless steel ribbon spool is provided at the discharge terminus of my conveyer system, any extension or retraction of conveyer length (1) requires relative movement between the extended ribbon and its supports and (2) requires that the entire length of extended ribbon be moved along the mine passageway. However when the stainless steel ribbon spool is provided at the loading terminus, as preferred, extension or retraction of the conveyor length can be accomplished without movement of the extended ribbon relative to its supports and without requiring power for moving the entire length of extended ribbon.

Referring to Figure 5, a mobile tailpiece 40 is provided at the loading terminus of my new conveyer system. The tailpiece 40 is mounted on skids 41 which permit movement in a straight line. Vertical supports 42, 43 and 44, rigidly secured to the skids 41, extend upwardly to form the super-structure of the tailpiece 40. A pillow block 45 is mounted on each of the forward vertical supports 44 to receive a shaft 46 of a belt roller 47, thereby rotatably supporting the roller 47 in a generally horizontal position.

A horizontal support 48, extending between the vertical supports 43 and 44, is provided with an axle journal (not shown) for rotatably supporting an axle 51 of a spool 49 of stainless steel ribbon in a generally horizontal position. A ratchet wheel 50 is mounted coaxially on the axle 51 of the spool 49. A spring loaded pawl 52 engages the teeth of the ratchet wheel 50 to prevent rotation of the spool 49 in a ribbon unwinding direction during operation of my conveyer system.

At the discharge end of the tailpiece 40 a troughed idler roller 53 is mounted for supporting and shaping stainless steel ribbon 54 which has been unwound from the spool 49. A hitching bar 55 is provided at the forward end of the tailpiece 40 for hitching a tractive power source to move the tailpiece 40, for example, by means of a cable 56. An upwardly and outwardly flared apron 57 is provided on each side of the loading tailpiece 40 attached to the tops of the vertical supports 42, 43 and 44. A similar upwardly and outwardly flared apron 58 is provided at the forward end of the tailpiece 40 attached to the forward ends of the lateral aprons 57. The aprons 57 and 58 direct the loading of solid material onto my conveyer system.

For supporting the stainless steel ribbon, roof jacks 59 are provided in pairs having an idler conveyer roller 60 mounted between them. Conventional horizontal belt idler rollers 61 may be placed on the floor of the mine at suitable intervals to support the return run of the conveyer belt.

Conveyer belting 62 returns empty over the horizontal idler rollers 61 and is turned over the belt pulley 47 and slides, during its loaded run, over the troughed stainless steel ribbon 54.

As shown in Figure 5 the belt turnaround pulley 47 has a diameter larger than that of the stainless steel spool 49 to maintain the moving conveyer belting out of contact with the spool. Alternately the moving belting may be directed around the stainless steel ribbon 49 over a series of smaller belt pulleys (not shown).

Figures 6 through 9 illustrate a highly mobile embodiment of the present invention in which both the discharge terminus and the loading terminus are mounted on wheels or caterpillar treads for facile movement through a mine. Figures 6 and 7 are a side elevation and a plan view respectively of the discharge terminus of this embodiment of my conveyer system.

Referring to Figures 6 and 7 a portable discharge terminus 70, mounted on wheels 71, comprises a generally horizontal chassis 72 and an inclined boom 73 having transverse troughed idler rollers 74 for shaping and guiding a moving conveyer belt 75 toward a turnaround roller 76 rotatably mounted at the forward end of the inclined boom 73. A yoke 77 extending forwardly from the discharge end of the inclined boom 73 is provided with a vertical circular opening 78 at its center for receiving a vertical pin 79 securely mounted in the roof of the mine above the point of belt discharge. Thus the entire discharge terminus 70 can be pivoted about the vertically depending pin 79.

At the loading end of the discharge terminus 70 the free end of a stainless steel ribbon 80 is securely fastened.

Referring to Figure 8 and 9, a tailpiece 90, mounted on wheels or caterpillar treads 91 for mobility, contains a spool 92 of stainless steel ribbon 80 provided with tensioning means. A belt turnaround pulley 93 is rotatably mounted at the loading end of the tailpiece 90. Troughed idler rollers 94 are provided in line with the turnaround roller 93 to shape and guide conveyer belting 75 at the loading point. A yoke 95 extends forwardly from the tailpiece 90 and has at its center a vertical circular opening 96 for receiving an upwardly extending pin 97 embedded in the floor of the mine. Thus the entire tailpiece 90 can be pivoted about the pin 97.

Vertical idlers 98 are mounted on the tailpiece 90 at each side of its inby end to compress the stainless steel ribbon 80 into a troughed shape.

When the ribbon 80 is held in tension between the discharge terminus 70 and the loading tailpiece 90, the entire conveyer system is automatically aligned in a straight line between the vertical pin 79 and the vertical pin 97.

From the foregoing description it is apparent that two ribbons of stainless steel may be provided to permit support of both the loaded run and the return run of belting. Each of the ribbons may be supported on conventional belt supporting means. However when using two stainless steel ribbons I prefer to obtain independent, self support thereof by providing the lower ribbon wider than the upper ribbon whereby a passage is established therebetween when the two ribbons are joined hereinafter described along their edges. In this embodiment of the present invention no auxiliary supporting means are required, as will be seen by reference to Figures 10, 11, 12, 13 and 14.

As shown in Figure 10, a tailpiece 100 is provided with two spools of stainless steel ribbon 101 and 102. The spool 101 contains an upper stainless steel ribbon 103 for supporting an upper loaded conveyer belt 104. The spool 102 contains a lower ribbon of stainless steel 105 having a greater width than the upper ribbon 103. The two ribbons 103 and 105 are joined at their outer edges whereby the lower ribbon 105 serves to support the upper ribbon 103 in an elevated position above the floor of the mine and to guide the passage of return unloaded conveyer belting 106. The lower and wider ribbon 105 is adapted to rest at its central troughed portion upon the floor of the mine. In this embodiment, the tailpiece 100 preferably is self-tramming by means of motive power (not shown) and accordingly is equipped with caterpillar treads 107 for mobility. A vertical idler roller 108 is provided at each side of the inby end of the tailpiece 100 for troughing the stainless steel ribbons 103 and 105.

As the stainless steel ribbons 103 and 105 are unspooled and extended from the tailpiece 100, their outer edges are securely clamped together by any convenient means. Since the lower ribbon 105 has a greater width than the upper ribbon 103, clamping of their edges secures both ribbons 105 and 103 in a troughed configuration with an open passage between them for movement of a return conveyer belting 106. A loaded conveyer belting 104 can be supported on the upper ribbon 103 above the floor of the mine and out of contact with the return belting 106.

One convenient means for fastening the edges of the two ribbons 103 and 105 is illustrated in Figures 11, 12 and 13. The outer edges of each stainless steel ribbon may be provided as shown in Figure 13 with a corrugated border 109 having, for example, outer perpendicular ridges 110 and inner perpendicular ridges 111 separated by longitudinal ridges 112. The knurled edges of each of the ribbons 103 and 105 correspond for intermeshing and may be maintained in fixed relation by applying suitable clamping means 113 at suitable intervals along the extension of the two ribbons.

As shown in Figure 11, the clamping device 113 comprises a J-shaped support having a handle 114 and a jaw extension 115 for surrounding the knurled edges of the stainless steel ribbons 103 and 105. A pad of gasketing material 116 is provided on the inner surface of the jaw 115 for engaging the knurled edges of the stainless steel ribbons. A pin 117 is provided on the handle 114 in line with the pad 116 for securing a locking element 118 having a handle 119 and a cam extension 120. The clamp 113 at the left side of Figure 11 is shown in a locked position in which the cam 120 of the locking element 118 comprises the edges of the ribbons against the pad of gasketing material 116. At the right hand side of Figure 11, clamp 113 is shown in an open position in which the handle 119 of the locking element 118 is turned about the pin 117 to remove the cam 120 from engagement with the edges of the stainless steel ribbon.

I may provide a supporting pin 121 having a pointed tip 122 at one end for insertion into the floor of the mine and having a socket 123 at the other end for receiving the end of the clamp handle 114. The supporting pin 121, when embedded in the floor of the mine and engaging the clamp handle 114 provides positive lateral support for the conveyer system and also serves as a lock to hold the clamp 113 in a closed position.

The discharge terminus of this embodiment of my conveyer system is illustrated in Figure 14 wherein a belt drive and material discharge unit 125 is mounted on horizontal skids 126 which support a forwardly extending boom 127 in an inclined elevated position. The extremities of the stainless steel ribbons 103 and 105 are securely fastened to the loading end of the belt drive and material discharge unit 125 by suitable clamping means 128. A belt turnaround roller 129 is provided at the forward end of the inclined elevated boom 127 for discharging the contents of the conveyer belting 104 into a primary conveying system which may be a mine car 130 as shown in Figure 14 or could be a mother conveyer belt if desired. One or more belt drive rollers 131 are mounted within the belt drive and material discharge unit 125 to provide motive power for the conveyer belting.

The conveyer system illustrated in Figures 10 through 14 is self-supporting on the mine floor and self-aligning throughout its haulage length. Extension of this conveyer system may be readily accomplished by severing the conveyer belting at an existing splice, advancing the tailpiece 100 to the desired new loading position, applying the necessary clamping means for securing the edges of the two stainless steel ribbons, and installing the required length of additional conveyer belting. As in the other embodiment of my new conveyer system, the spools of stainless steel ribbon may be provided at the discharge terminus of the system in which case the tailpiece at the loading end of the conveyer length would serve as a clamping means for the unspooled ends of the ribbons and as a turnaround for the conveyer belting itself. With the spools at the discharge terminus, the flexible conveyer belting could be laced from the upper ribbon, around the first spool, and between the two spools onto the lower ribbon.

It is not necessary that the free ends of the ribbon material be fastened to the mobile apparatus provided at the terminus of my conveyer distant from the terminus containing the spools. It is apparent that the free ends can be secured to independent anchoring means adjacent to the mobile apparatus. Similarly, the present invention may be applied to long existing straight line belt conveyers of a semi-permanent type, e. g., a train of conventional conveyer pan sections. In said application, the entire existing straight line belt conveyer may be deemed to be the discharge terminus extending up to several thousand feet or more with the extensible conveyer of the present invention providing flexibility in length only at the loading end of the conveyer system.

According to the provisions of the Patent Statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. An extensible straight line belt conveyer comprising a mobile loading tailpiece at the loading terminus, material discharge means at the discharge terminus, ribbon material mounted on and extensible from a spool at one terminus, means at the other terminus for securing the free end of said ribbon material, means for supporting said ribbon material between the termini in a generally troughed shape, an endless single strand of flexible conveyer belting slidable along said ribbon material, said strand being laced over said ribbon material in surface contact therewith, through each terminus and beneath said ribbon material out of contact therewith, and means beneath said ribbon material for supporting said conveyer belting between the said termini.

2. An extensible straight line belt conveyer comprising at its loading terminus a mobile loading tailpiece having low friction ground engaging supports and containing belt turning means and a spool having coiled thereon a ribbon material extensible therefrom, mobile belt discharge means at the discharge terminus comprising belt turning means and means for securing the free end of said ribbon material whereby said ribbon material is maintained in tension between the termini, means for supporting said ribbon material between the termini in a generally troughed shape, an endless single strand of flexible conveyer belting slidable along said ribbon material in surface contact therewith, through each terminus over said belt turning means and beneath said ribbon material out of contact therewith, and means beneath said ribbon material for supporting said conveyer belting between the said termini.

3. An extensible straight line belt conveyer comprising a mobile loading tailpiece at the loading terminus, belt discharge means at the discharge terminus, ribbon material mounted on and extensible from a spool at one terminus, means at the other terminus for securing the free end of said ribbon material, a pivoted securing means associated with each terminus for positioning each terminus in pivotal relation to a fixed vertical axis, means for maintaining said ribbon material in tension between said termini, means for supporting said ribbon material between said termini in a generally troughed shape, an endless single strand of flexible conveyer belting slidable along said ribbon material, said strand being laced over said ribbon material, through each terminus and beneath said ribbon material out of contact therewith, and means beneath said ribbon material for supporting said conveyer belting between the said termini.

4. An extensible straight line belt conveyer comprising belt discharge means at the discharge terminus comprising belt turning means and a spool having coiled thereon a ribbon material, a mobile loading tailpiece at the loading terminus comprising belt turning means and means for securing the free end of said ribbon material whereby said ribbon material is maintained in tension between the termini, means for supporting said ribbon material between the termini in a generally troughed shape, an endless single strand of flexible conveyer belting slidable along said ribbon material, said strand being laced over said ribbon material in surface contact therewith, through each terminus over said belt turning means and beneath said ribbon material out of contact therewith, and means beneath said ribbon material for supporting said conveyer between the said termini.

5. An extensible straight line belt conveyer comprising a mobile loading terminus and a mobile discharge terminus, a ribbon material coiled for unreeling about a spool mounted in one of said termini, releasable locking means for preventing rotation of said spool to restrict further unreeling of said ribbon material, means associated with the other of said termini for securing the free end of said ribbon material, means for supporting said ribbon material between said termini in a generally troughed shape, belt turning means in each termini spaced from contact with said ribbon material, an endless single strand of conveyer belting slidable along said ribbon material, said strand passing over said belt turning means in each termini and extending between said termini over said ribbon material in surface contact therewith and beneath said ribbon material out of contact therewith, and means beneath said ribbon material for supporting said strand between the said termini.

6. An extensible straight line belt conveyer comprising a mobile loading terminus and a discharge terminus, a first coil of first ribbon material mounted on a first spool and a second coil of second ribbon material mounted on a second spool, parallel to the first, both of said spools being mounted in one of said termini, means associated with the other terminus for securing the free end of each of said ribbon materials in tension between said termini whereby said first ribbon material is above and axially parallel to said second ribbon material, means for supporting said first ribbon material in a generally troughed shape between said termini, means for supporting said second ribbon material beneath said first ribbon material, an endless single strand of flexible conveyer belting slidable along said ribbon materials, said strand passing over said first ribbon material in surface contact therewith, passing through said discharge terminus, passing over said second ribbon material in surface contact therewith and passing through said loading terminus, around said first spool to said first ribbon material, and motive means for moving said strand over said ribbon materials.

7. An extensible straight line belt conveyer comprising a mobile loading terminus and a discharge terminus, a first coil of first ribbon material and a second coil of second ribbon material wider than said first ribbon material, both coils being mounted on separate parallel spools in one of said termini, means at the other terminus for securing the free end of each of said ribbon materials whereby said ribbon materials are maintained in tension between the termini, means for securing each edge of said second ribbon material to the corresponding edge of said first ribbon material at spaced points whereby both ribbons assume a generally troughed shape and establish a passage therebetween, an endless strand of flexible conveyer belting slidable along said ribbon materials passing along the top of said first ribbon material in surface contact therewith, passing through said discharge terminus, passing along the top of said second ribbon material in surface contact therewith through the said passage, and passing through said loading terminus to said first ribbon material, and motive means for moving said strand over said ribbon material.

8. An extensible straight line belt conveyer comprising a mobile loading terminus and a discharge terminus, a first coil of first ribbon material mounted on a first spool in said loading terminus, a second coil of second ribbon material wider than said first ribbon material, mounted on a second spool, parallel to said first spool in said loading terminus, means for securing the free end of each of said ribbon materials to said discharge terminus, whereby said ribbon materials are maintained in tension between the termini, means for securing each edge of said second ribbon material to the corresponding edge of said first ribbon material at spaced points whereby both ribbons assume a generally troughed shape and establish a passage therebetween, an endless strand of flexible conveyer belting slidable along said ribbon materials passing along the top of said first ribbon material in surface contact therewith, passing through said discharge terminus, passing along the top of said second ribbon material in surface contact therewith through the said passage, and passing through said loading terminus between said first and second spools, and said first spool to said first ribbon material, and motive means associated with said discharge terminus for moving said strand over said ribbon material.

9. An extensible straight line belt conveyer comprising a mobile loading terminus and a discharge terminus, a first coil of first ribbon material mounted on a first spool in said discharge terminus, a second coil of second ribbon material wider than said first ribbon material, mounted on a second spool, parallel to said first spool in said loading terminus, means for securing the free end of each of said ribbon materials to said loading terminus, whereby said ribbon materials are maintained in tension between the termini, means for securing each edge of said second ribbon material to the corresponding edge of said first ribbon material at spaced points whereby both ribbons assume a generally troughed shape and establish a passage therebetween, an endless strand of flexible conveyer belting slidable along said ribbon material passing along the top of said first ribbon material in surface contact therewith, passing through said discharge terminus between said first and second spools, around said second spool to said second ribbon material, passing along the top of said second ribbon material in surface contact therewith through the said passage, and passing through said loading terminus, and motive means for moving said strand over said ribbon materials.

10. A mobile loading tailpiece for use in an extensible straight line belt conveyer system comprising a frame supported above ground level by ground engaging elements adapted to permit movement of the entire structure along the ground, a rotatable belt roller at one end of said frame for reversing direction of conveyer belting, supporting means for conveyer belting above and below the axis of said belt roller, a spool for winding thereabout in a coil a ribbon material, said spool being rotatable about an axis parallel to said belt roller, said axis being vertically spaced between said supporting means for conveyer belting, a coil of ribbon material wound about said spool having a free end extensible from said spool on unwinding thereof, and releasable means for preventing rotation of said spool in a coil unwinding direction.

11. A mobile loading tailpiece for use in an extensible belt conveyer system comprising a frame supported above the ground by ground engaging elements which are adapted to permit movement of the entire structure along the ground, a belt roller mounted at one end of said frame and rotatable about a horizontal axis for reversing direction of conveyer belting engageable therewith, upper supporting means for supporting conveyer belting moving away from said belt roller and lower supporting means for supporting conveyer belting moving toward said belt roller, a spool mounted within said frame for rotation about an axis parallel to that of said belt roller, said spool being vertically spaced between said upper supporting means and said lower supporting means, a ribbon material having one end coiled about said spool and having a free end extendible from said spool upon rotation thereof, releasable locking means associated with said spool to prevent its rotation in the direction causing unwinding of said ribbon material and ribbon material troughing means mounted on the end of said frame opposite said belt roller to distort said ribbon material into a generally troughed shape.

12. A mobile loading tailpiece for use in an extensible belt conveyer system comprising a frame supported above the ground by ground engaging elements which are adapted to permit movement of the entire structure along the ground, a belt roller mounted at one end of said frame and rotatable about a horizontal axis for reversing direction of conveyer belting engageable therewith, upper supporting means on said frame for supporting conveyer belting moving away from said belt roller, lower supporting means for supporting conveyer belting moving toward said belt roller, a first spool and a second spool each mounted within said frame for rotation about its own axis positioned parallel to the axis of said belt roller, said first and second spool being vertically spaced between said upper supporting means and said lower supporting means, a first flat smooth surface high tensile strength ribbon coiled about said first spool and having a free end extendible from said first spool on rotation thereof, and a second flat smooth surface high tensile strength ribbon, coiled about said second spool and having a free end extendible from said second spool on rotation thereof, whereby on extension, said second ribbon is beneath said first ribbon.

No references cited.